Oct. 29, 1963  E. J. ATELIANI  3,108,669
AUTOMATIC BRAKING MECHANISM
Filed Jan. 12, 1962
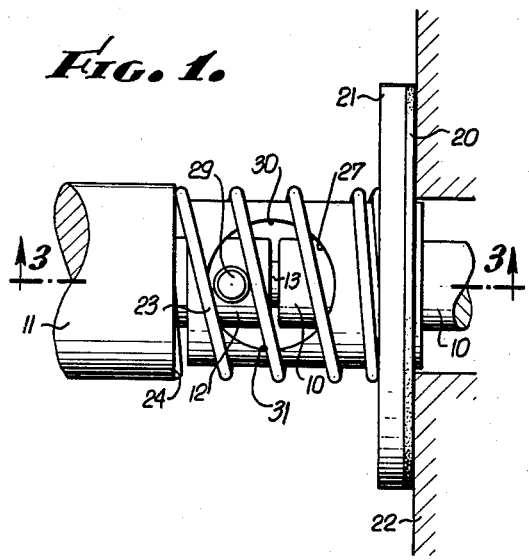
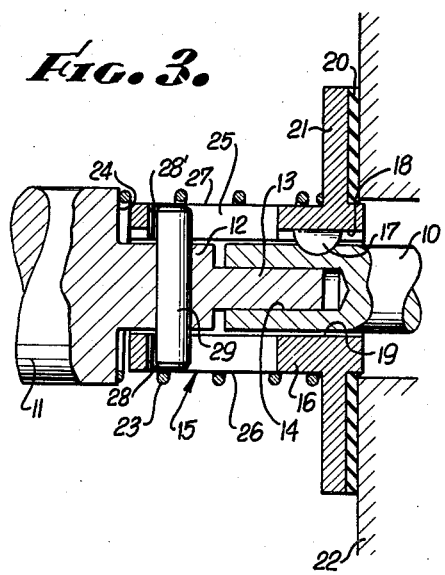
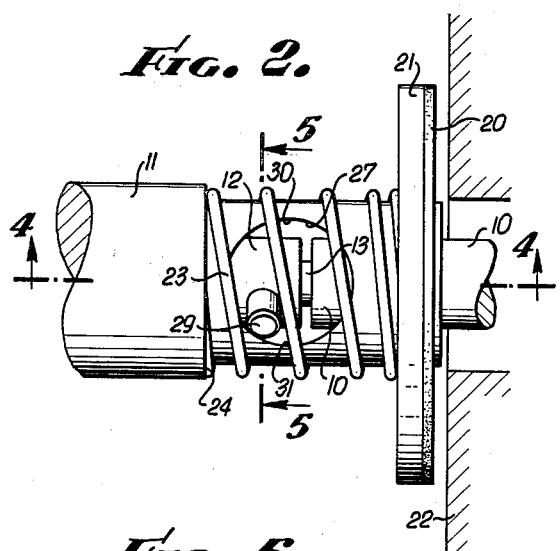
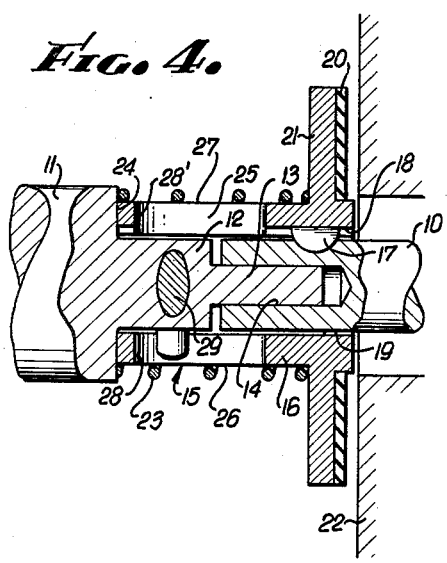
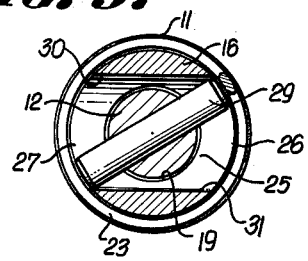
INVENTOR.
EDMOND J. ATELIANI
BY
Flam and Flam
ATTORNEYS.

3,108,669
AUTOMATIC BRAKING MECHANISM
Edmond J. Ateliani, Los Angeles, Calif., assignor, by mesne assignments, to The Emerson Electric Manufacturing Company, St. Louis, Mo., a corporation of Missouri
Filed Jan. 12, 1962, Ser. No. 165,754
2 Claims. (Cl. 192—8)

This invention relates to an automatic brake or clutch mechanism, and particularly to an automatic braking mechanism for restraining a driven shaft when the power shaft is stopped.

Braking mechanisms of this character are useful for many purposes, such as to prevent creeping in control mechanisms or to prevent backspin of pump shafts.

The primary object of this invention is to provide a novel mechanism of this general character that is remarkably simple in construction.

In carrying out my invention, use is made of a coupling member interposed between the power shaft and the driven shaft. The coupling member is keyed or splined to the driven shaft to allow axial movement, and biased in an axial direction to engage the brake. The power shaft is connected to the coupling member through a bi-directional cam arrangement which causes retraction of the coupling member to release the brake upon application of torque. The cam has a stop which results ultimately in a positive driving connection between the shafts after the brake is released. When the power shaft is stopped, the biased coupling member rides back down the cam and the brake is reapplied.

Another object of this invention is to provide a cam arrangement for the foregoing purposes which can be easily manufactured. For this purpose, the coupling member is in the form of a sleeve having a transverse circular bore forming two generally circular apertures at opposite sides. The edges of the apertures respectively cooperate with ends of a transverse pin carried by a power shaft entering the sleeve. The pin forms one cam element and the apertures form companion bi-directional stopped cam elements.

This invention possesses many other advantages, and has other objects which may be made more clearly apparent from a consideration of one embodiment of the invention. For this purpose, there is shown a form in the drawings accompanying and forming a part of the present specification, and which drawings, unless as otherwise indicated, are true scale. This form will now be described in detail, illustrating the general principles of the invention; but it is to be understood that this detailed description is not to be taken in a limiting sense, since the scope of this invention is best defined by the appended claims.

Referring to the drawings:

FIGURES 1 and 2 are side elevational views of an automatic brake mechanism incorporating the present invention, and showing, respectively, applied and released positions;

FIGS. 3 and 4 are axial sectional views taken along planes corresponding to lines 3—3 and 4—4 of FIGS. 1 and 2 respectively; and FIG. 5 is a transverse sectional view taken along a plane corresponding to line 5—5 of FIG. 2.

In the drawings there is disclosed a shaft 10 adapted to be driven by a shaft 11. The shafts 10 and 11 are coaxially supported by suitable means (not shown). In the present example, the shafts are serially arranged.

The power shaft 11 has a reduced end 12 that corresponds in external diameter to that of the driven shaft 10 which it closely opposes. A reduced extension 13 projecting from the shaft end 12 is piloted in a cylindrical recess 14 at the end of the driven shaft 10.

Normally it is desired to restrain the driven shaft 10 from movement. For this purpose, a coupling member 15 is provided. The coupling member has a hollow sleeve or hub portion 16 that fits about the reduced end 12 of shaft 11 and the adjacent end of the driven shaft 10.

The coupling member 15 is coupled to the driven shaft 10 for rotation therewith, but axially movable relative thereto. For this purpose, a key 17 mounted by the driven shaft 10 enters a groove 18 that opens into the otherwise cylindrical bore 19 of the sleeve or hub 16.

The coupling member 15 carries a friction material 20 on one side of an integral circular flange 21. The friction material 20 is urged against a relatively nonrotary part 22, thereby normally to restrain the driven shaft 10 from rotation.

In order normally to apply the brake, a coil spring 23 is provided. The coil spring 23 surrounds the hub 16. One end of the spring 23 engages the base of the circular flange 21, and the other end of the spring engages the shoulder 24 formed by the reduced shaft end 12.

In order to release the brake, a cam arrangement is provided. For this purpose, the sleeve or hub 16 has a transverse cut or bore 25 intersecting the periphery of the hub 16 at generally circular edges 26 and 27. One point 28 at the circular edge 26 is farthest removed in the direction corresponding to retraction of the brake. An implement inserted in one end of the bore 26 for retracting the coupling member will naturally tend to engage at the point 28 since the point forms an apex, and the edge portions on opposite sides of the point 28 form symmetrical cam parts. A corresponding apex 28' is formed at the other edge 27 of the bore 25. The apices 28 and 28' fall at the ends of a straight line parallel to the axis of the bore 25.

Operating in the bore 25 and contacting the edges 26 and 27 is a cross pin 29 carried by the power shaft end 12. One end of the pin 29 is located at the edge 26, and has substantial clearance therein; and the other end of the pin is correspondingly located at the edge 27. The pin 29, as shown in FIG. 1, is capable of occupying a position in which it is parallel to the bore axis and just opposite the apices 28 and 28'.

Upon angular movement of the shaft 11 in one direction, corresponding cam follower surfaces at edges 26 and 27 are engaged. A component of force is thereby exerted on the coupling member 15 that is directed parallel to the axis thereof and in a direction to release the brake 20 against the force of the coil spring 23. Upon continued movement of the power shaft 11, the coupling member 15 is rotated by virtue of the fact that the cam follower surfaces have a limited extent. Thus, should the pin reach the lateral points 30 or 31, there will be no further force component tending to retract the coupling member, and a positive coupling between the pin 29 and the coupling member results. This is true whatever the direction of roation of the shaft 11 is. Accordingly, in one continuous smooth operation, the shaft 11 first releases the brake and then rotates the shaft 10.

In the present example, the retraction of the coupling member 15 is limited by the spacing between the shoulder 24 and the end of the sleeve 16, as indicated in FIGS. 2 and 4, and the positive drive is thus effective before the pin 29 moves to the point 30 or 31. The spacing of the shoulder 24 from the hub 16 in effect forms a limit to the cam follower surfaces.

When rotation of the shaft 11 is discontinued, the shafts stop, and the spring 23 causes advancement of the coupling member 15 along a spiral path as determined by the pin 29. Accordingly, the brake is reapplied and the shaft 10 is restrained from movement.

The inventor claims:

1. In an automatic brake: a pair of shafts serially mounted for rotation about a common axis; a coupling member having a sleeve portion surrounding the ends of the respective shafts; keying means between the coupling member and one of the shafts for establishing a rotary coupling therebetween, said keying means permitting axial movement of said coupling member along said one shaft; said coupling member having a flange; friction material secured to the flange; a non-rotary wall engageable with the friction material upon movement of the coupling member in one direction for restraining angular movement thereof; said sleeve portion having a transverse substantially circular bore; a pin carried by the other shaft and having ends located at the ends of said bore; the ends of said bore forming cam followers engaged by the pin for retraction of said coupling member upon rotation of said other shaft and for subsequent rotation of said coupling member thereby.

2. In an automatic brake: a pair of shafts serially mounted for rotation about a common axis; a coupling member having a sleeve portion surrounding the ends of the respective shafts; keying means between the coupling member and one of the shafts for establishing a rotary coupling therebetween, said keying means permitting axial movement of said coupling member along said one shaft; said coupling member having a flange; friction material secured to the flange; a non-rotary wall engageable with the friction material upon movement of the coupling member in one direction for restraining angular movement thereof; said sleeve portion having a through transverse cut intersecting the sleeve at diametrically opposite sides, the edges of the cut defining cam surfaces; and a pin carried by the other of the shafts and engaging the cam surfaces at opposite sides of the sleeve for retraction of said coupling member upon rotation of said other shaft; said cam surfaces having portions extending substantially parallel to the said common axis and engaged by the pin after retraction of said coupling member to effect a positive drive therewith.

References Cited in the file of this patent

UNITED STATES PATENTS

| | | |
|---|---|---|
| 1,414,000 | Todd | Apr. 25, 1922 |
| 2,172,440 | Edmondson | Sept. 12, 1939 |
| 2,812,044 | Cole | Nov. 5, 1957 |
| 2,834,443 | Olchawa | May 13, 1958 |
| 2,925,157 | Davis | Feb. 16, 1960 |

FOREIGN PATENTS

| | | |
|---|---|---|
| 519,273 | Germany | Feb. 5, 1931 |